(12) United States Patent
Sanekata et al.

(10) Patent No.: US 12,320,311 B2
(45) Date of Patent: Jun. 3, 2025

(54) VALVE DEVICE (71) Applicant: MIKUNI CORPORATION, Tokyo (JP)

(72) Inventors: Yuuhei Sanekata, Odawara (JP); Keigo Suzuki, Odawara (JP); Taiki Tagaya, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 89 days.

(21) Appl. No.: 18/477,026

(22) Filed: Sep. 28, 2023

(65) Prior Publication Data

US 2024/0117774 A1 Apr. 11, 2024

(30) Foreign Application Priority Data

Oct. 6, 2022 (JP) .................................. 2022-161432
Aug. 1, 2023 (JP) .................................. 2023-125692

(51) Int. Cl.
*F02D 9/10* (2006.01)
*F02D 9/02* (2006.01)
*F16K 1/22* (2006.01)
*F16K 27/02* (2006.01)
*F16K 31/04* (2006.01)

(52) U.S. Cl.
CPC .......... *F02D 9/1065* (2013.01); *F16K 31/043* (2013.01); *F02D 2009/0269* (2013.01); *F02D 2009/0277* (2013.01); *F16K 1/221* (2013.01); *F16K 27/0218* (2013.01)

(58) Field of Classification Search
CPC ................. F02D 2009/0269; F02D 2009/0277

USPC .............................. 251/248, 250.5, 304, 305
See application file for complete search history.

(56) References Cited

U.S. PATENT DOCUMENTS

| | | | | |
|---|---|---|---|---|
| 5,492,097 A | * | 2/1996 | Byram | F02D 11/107 251/129.01 |
| 5,809,780 A | * | 9/1998 | de Jong | F16K 31/53 251/249 |
| 6,155,533 A | * | 12/2000 | Semeyn | F02D 11/107 123/399 |
| 6,173,939 B1 | * | 1/2001 | Dottavio | F16K 1/221 251/305 |
| 6,244,565 B1 | * | 6/2001 | McDonnell | F02D 11/10 251/305 |

(Continued)

FOREIGN PATENT DOCUMENTS

JP 2014-105691 A 6/2014

*Primary Examiner* — Robert K Arundale
(74) *Attorney, Agent, or Firm* — STAAS & HALSEY LLP (57) ABSTRACT

A torsion coil spring biasing and rotating a drive gear of a valve device in one direction and defining a rotation position of a valve body when an electric motor is not operating is included, one end of the torsion coil spring is locked at any one of two locking portions provided at the drive gear, the other end is locked at a casing rotatably supporting the valve shaft, the drive gear is a plate-shaped members including two locking portions and formed linearly symmetrically, the locking portions are formed into hook shapes including extending portions extending in a direction away from an inner surface of the drive gear and distal end portions projecting along the inner surface from distal ends of the extending portions. The drive gear includes openings at positions at which the openings overlap the distal end portions in a view in a direction of the axial line.

6 Claims, 9 Drawing Sheets

(56) References Cited

U.S. PATENT DOCUMENTS

| | | | | |
|---|---|---|---|---|
| 6,267,352 | B1* | 7/2001 | Semeyn, Jr | F02D 9/1065 |
| | | | | 251/313 |
| 6,925,986 | B2* | 8/2005 | Cannone | F02D 9/1065 |
| | | | | 123/396 |
| 7,017,882 | B2* | 3/2006 | Marsh | F16K 31/53 |
| | | | | 251/248 |
| 12,098,689 | B2* | 9/2024 | Kimura | F02D 9/1065 |
| 12,140,248 | B2* | 11/2024 | Sanekata | F16K 1/221 |
| 2008/0236541 | A1* | 10/2008 | Tsukiji | F02D 9/1065 |
| | | | | 123/337 |
| 2018/0238209 | A1* | 8/2018 | Suzuki | F01N 13/18 |
| 2020/0240333 | A1* | 7/2020 | Moriya | F02D 9/1065 |
| 2020/0263640 | A1* | 8/2020 | Winter | F02D 9/1065 |
| 2024/0117773 | A1* | 4/2024 | Sanekata | F02D 9/108 |

* cited by examiner

VALVE DEVICE

CROSS REFERENCE TO RELATED APPLICATIONS

This application claims priority benefit from Japanese Patent Application No. 2022-161432 filed on Oct. 6, 2022 and Japanese Patent Application No. 2023-125692 filed on Aug. 1, 2023 the contents of each of which are incorporated herein by reference.

BACKGROUND OF THE INVENTION

Field of the Invention

The present invention relates to a structure of a drive system for a valve device.

Description of the Related Art

Many valves such as throttle valves have a configuration in which a flow path is formed in a housing, a valve body that opens and closes the flow path is fixed to a valve shaft, and the valve shaft is driven by a rotation actuator such as an electric motor. A decelerator is included between the rotation actuator and the valve shaft, and the valve shaft includes a drive gear as a part of the decelerator.

Furthermore, the throttle valve includes a return spring for defining a rotation angle (rotation position) of the valve when the rotation actuator is not operating.

For example, a valve device described in Japanese Patent Laid-Open No. 2014-105691 is configured such that two torsion coil springs, namely a return spring and a default spring, bias and rotate a drive gear fixed to a valve shaft to rotate and move a valve body to a predetermined default position when a rotation actuator is not operating.

Incidentally, in regard to valve devices including return springs as described above, there are two kinds of valve devices: those in which valve bodies are in an open state as a default position and those in which valve bodies are in a closed state as a default position; that is, biasing directions of the return springs are different even if the sectional area of flow paths and shapes of valve bodies are the same due to a difference in specifications.

Drive gears with different shapes have been prepared for return springs which are different only in biasing directions until now, and there are problems that the types of components may increase and it may lead to increases in component cost and component management cost.

A return spring is disposed to roll up around the periphery of a valve shaft, one end is locked at a locking portion with a hook shape provided in a drive gear, and the other end is locked at a valve body of a throttle valve in many structures. Furthermore, the drive gear is often molded by injecting a resin or the like into a space between a pair of facing mold dies, for example, to reduce manufacturing cost.

However, it is difficult to mold the drive gear using the locking portion with a hook shape with a pair of mold dies and to mold a plurality of drive gears at the same time, and reduction of manufacturing cost of the drive gear is required.

The present invention was made in view of such a problem, and an object thereof is to provide valve devices with different specifications while sharing components and reducing manufacturing cost.

SUMMARY OF THE INVENTION

In order to achieve the above object, a valve device according to the present invention including a gear at a shaft driving a valve body, driving and rotating the shaft via the gear by an actuator, and driving the valve body, includes: a torsion coil spring biasing and rotating the gear in one direction and defining a rotation position of the valve body when the actuator is not operating, one end of the torsion coil spring is locked at locking portions provided at the gear, and another end is locked at a casing rotatably supporting the shaft, the locking portions are provided at two locations of the gear at an interval in a circumferential direction, the gear is a plate-shaped member formed to be linearly symmetrical with respect to a line including the two locking portions and vertically passing through an axial line of the shaft as an axis of symmetry, the locking portions are formed into hook shapes including extending portions extending in a direction away from one side surface of the gear and distal end portions projecting along the one side surface from distal ends of the extending portions, and the gear includes openings at positions at which the openings overlap the distal end portions in a view in a direction of the axial line.

Preferably, the gear includes a support member made of metal and integrated through insert molding in a state where at least a part of the support member is exposed in one side surface, and an exposure portion of the support member of the gear and an end of the shaft are welded to configure a shaft unit.

Preferably, the gear has an exposure hole exposing the other side surface side of the support member on a rear side of the exposure portion, and a rear side of an abutting surface where the support member abuts the shaft is irradiated with laser light through the exposure hole from the other side surface side of the gear with the exposure portion of the support member and the end of the shaft caused to abut each other, to weld the support member and the shaft.

Preferably, the gear includes an insertion hole into which an end of the shaft is insertable at an arbitrary relative rotation angle.

Preferably, the valve device is a throttle valve controlling an amount of air intake of an internal combustion engine.

According to the valve device of the present invention, it is possible to lock, for example, a counterclockwise torsion coil spring at one locking portion of the two locking portions provided at the gear and to lock a clockwise torsion coil spring at the other locking portion.

Therefore, it is possible to provide a valve device biasing the shaft to clockwise rotation with the torsion coil spring and a valve device biasing the shaft to counterclockwise rotation with the torsion coil spring with the gear in common and thereby to reduce component cost and component management cost.

Also, since the openings are provided at the positions of the gear at which the openings overlap the distal end portions in the view in the direction of the axial direction although the locking portions provided at the gear have the hook shapes, it is possible to mold the gear including the locking portions with a pair of mold dies and to easily release the mold dies after the molding. It is thus possible to improve productivity of the gear and to reduce manufacturing cost.

DETAILED DESCRIPTION OF THE INVENTION

Hereinafter, an embodiment of the present invention will be described on the basis of the drawings.

Figure 1:
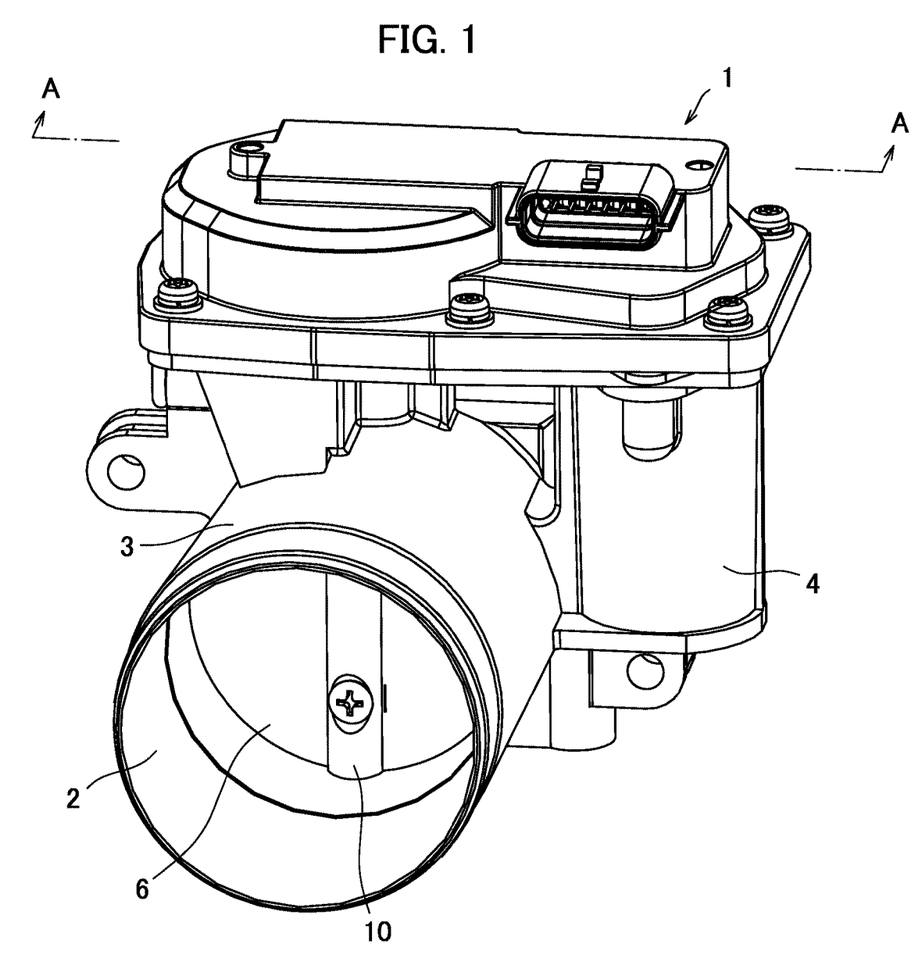
FIG. 1 is a perspective view of a valve device that employs a rotation angle detection structure according to an embodiment of the present invention.
Figure 2:
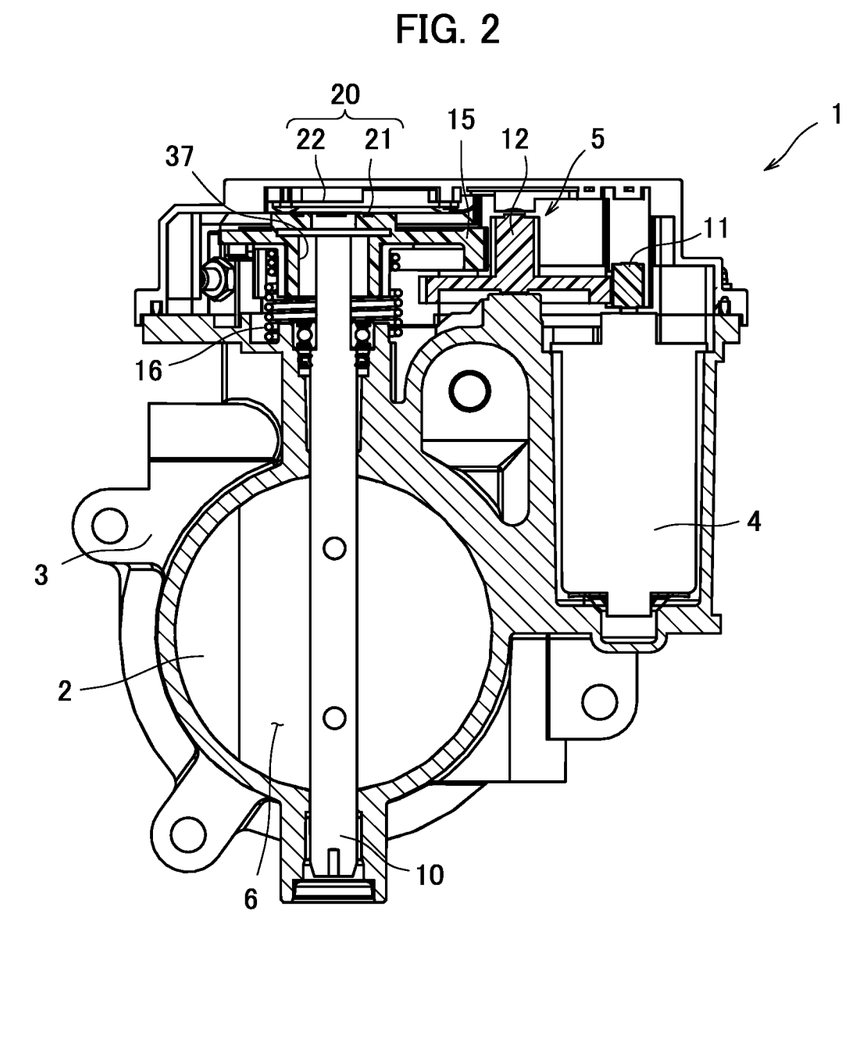
FIG. 2 is a vertical sectional view of the valve device according to the embodiment.

FIG. 1 is a perspective view of a valve device 1 that employs a rotation angle detection structure according to an embodiment of the present invention. FIG. 2 is a vertical sectional view of the valve device 1 according to the embodiment. Note that FIG. 2 is a sectional view along the A-A part illustrated in FIG. 1.

The valve device 1 that employs the rotation angle detection structure according to the embodiment of the present invention is, for example, a throttle valve and is placed in an intake passage of an internal combustion engine to control the amount of air intake.

As illustrated in FIGS. 1 and 2, the valve device 1 includes an electric motor 4 (actuator) and a decelerator 5 in a casing 3 (housing) with a fluid passage 2 as a part of the intake passage formed therein. The valve device 1 includes a valve body 6 that opens and closes the fluid passage 2 and a valve shaft 10 (shaft) rotatably supported by the casing 3 and disposed to traverse the fluid passage 2. The valve body 6 is fixed to the valve shaft 10.

The decelerator 5 is configured of a motor gear 11 fixed to an output shaft of the electric motor 4, an intermediate gear 12 rotatably supported by the casing 3, and a drive gear 15 (gear) fixed to one end of the valve shaft 10, and power is transmitted from the electric motor 4 to the motor gear 11, the intermediate gear 12, and the drive gear 15 in order to drive and rotate the valve shaft 10.

A return spring 16 is included to be adjacent to the drive gear 15 in the vicinity of the one end of the valve shaft 10. The return spring 16 is a torsion coil spring wound around the valve shaft 10 and has one end (16*a*) locked at the drive gear 15 and the other end (16*b*) locked at the casing 3. The return spring 16 biases the valve shaft 10 in one rotation direction.

The casing 3 includes two stoppers that are not illustrated and abut the drive gear 15. The stoppers limit the rotation angle of the valve shaft 10 within a range of a predetermined angle (90 degrees, for example).

When power is not distributed to the electric motor 4, the valve shaft 10 is rotated by a biasing force of the return spring 16, and the fluid passage 2 is fully closed (or fully opened) by the valve body 6. The valve shaft 10 is rotated against the biasing force of the return spring 16 by distributing power to the electric motor 4, and the amount of air intake flowing through the fluid passage 2 is adjusted by the valve body 6 rotating.

An inductive sensor 20 (non-contact sensor) that detects a rotation angle (rotation position) of the valve shaft 10 is included at one end of the valve shaft 10 on the side of the drive gear 15.

The inductive sensor 20 includes a detection target 21 provided at the drive gear 15 and made of metal and a sensor main body 22 fixed to the casing 3 and disposed near the detection target 21 to face it.

The sensor main body 22 of the inductive sensor 20 includes, for example, a sensor coil, generates a high-frequency magnetic field by causing a current to flow through the sensor coil, detects inductance of the sensor coil that is changed by the detection target moving in the magnetic field, and thereby detects a rotation angle of the valve shaft 10.

Figure 3:
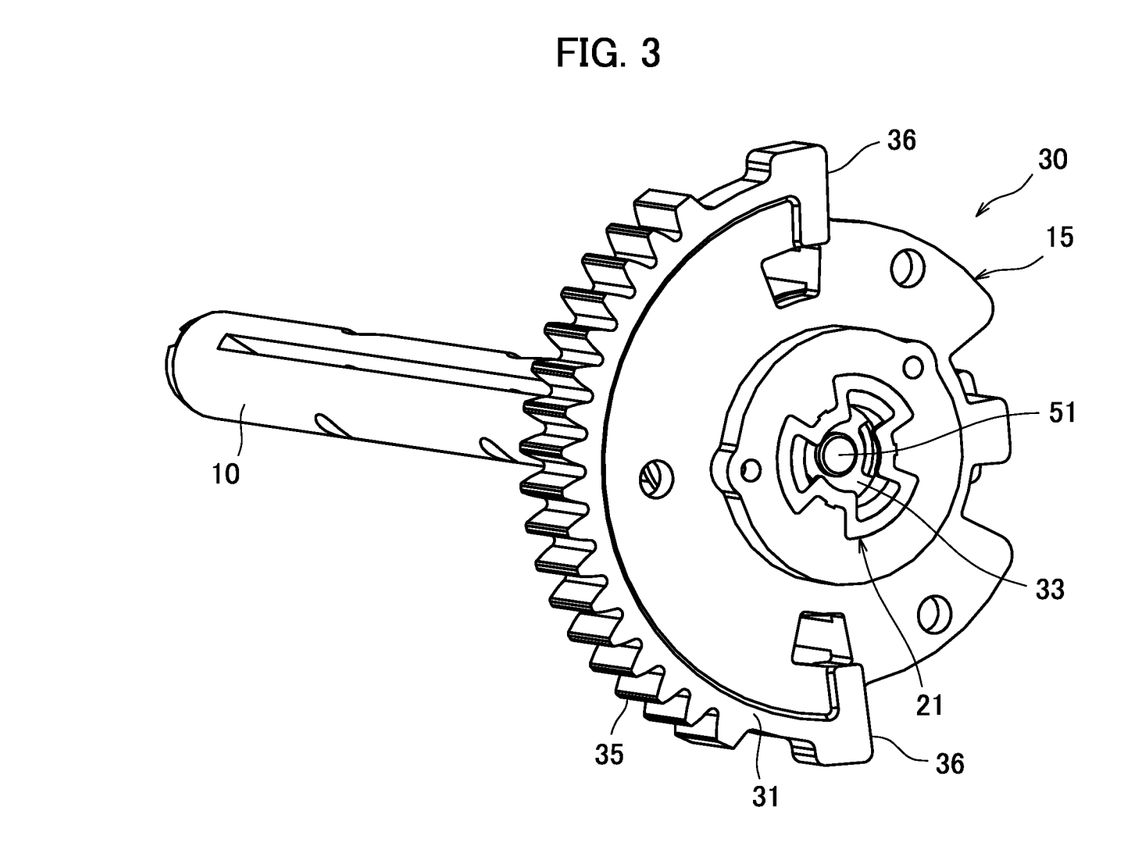
FIG. 3 is a perspective view of a valve shaft unit.
Figure 4:
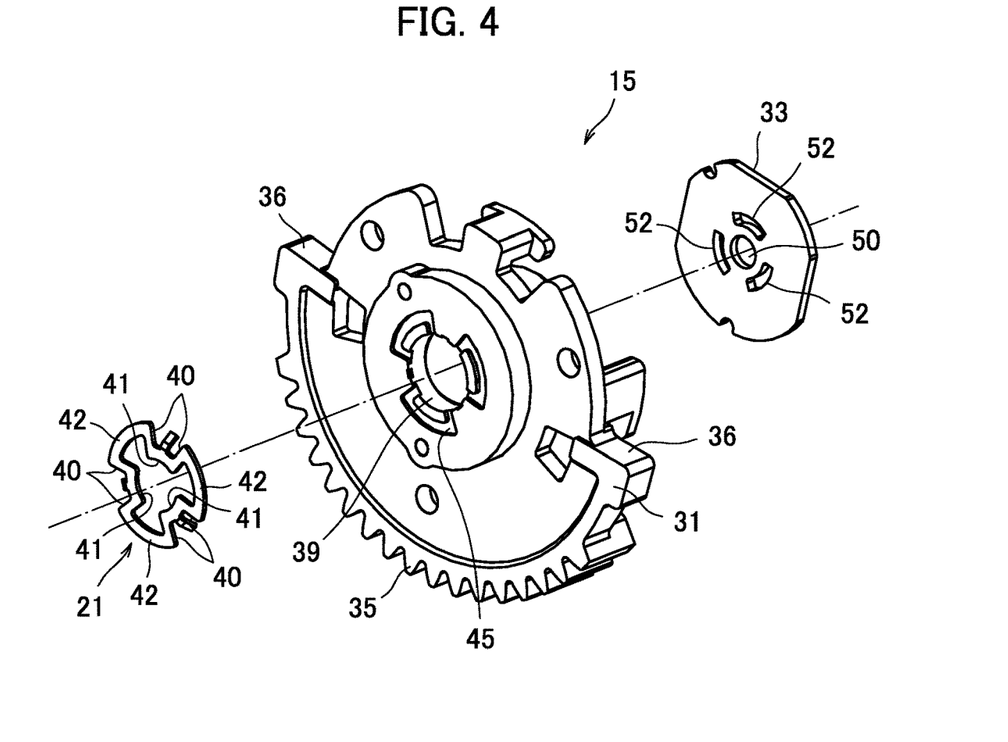
FIG. 4 is a diagram illustrating components of a drive gear in the valve shaft unit.
Figure 5:
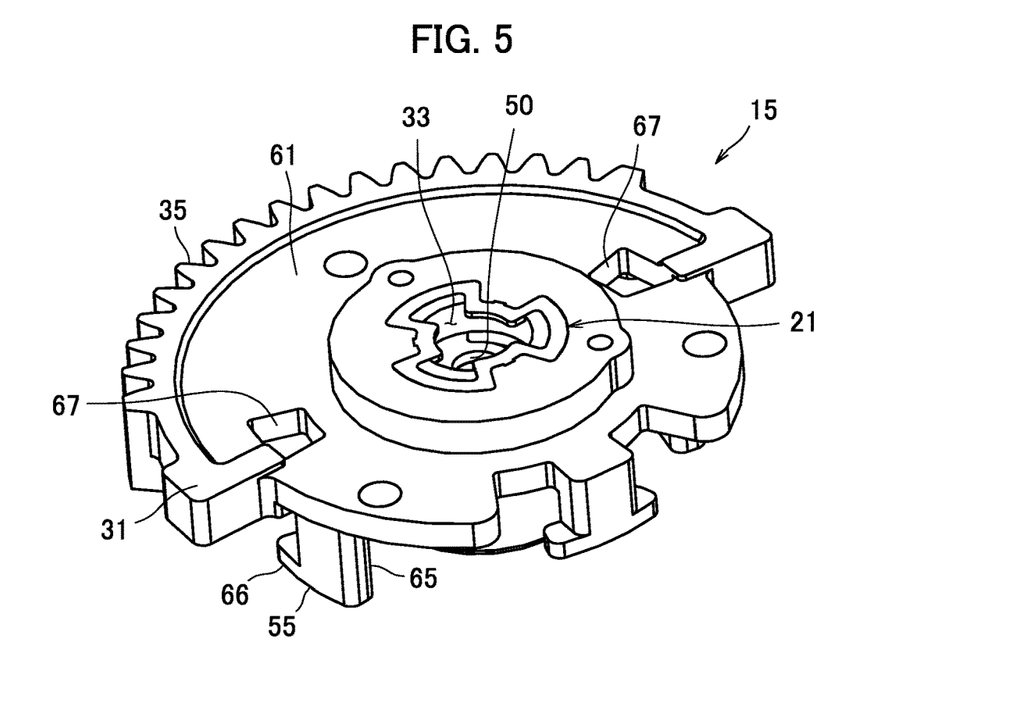
FIG. 5 is a perspective view of the drive gear in the valve shaft unit.
Figure 6:
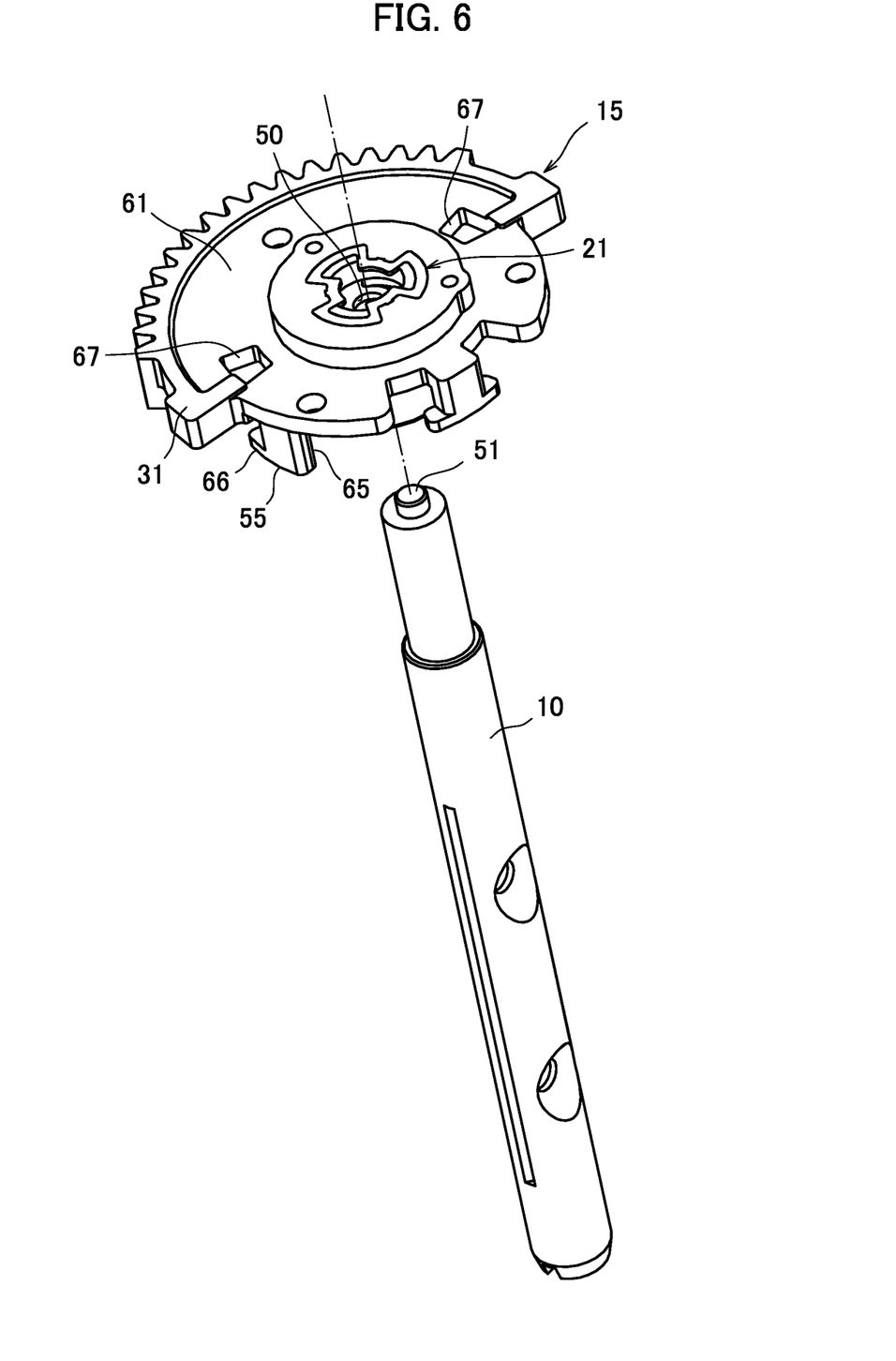
FIG. 6 is a perspective view of the drive gear and a valve shaft in the valve shaft unit.
Figure 7:
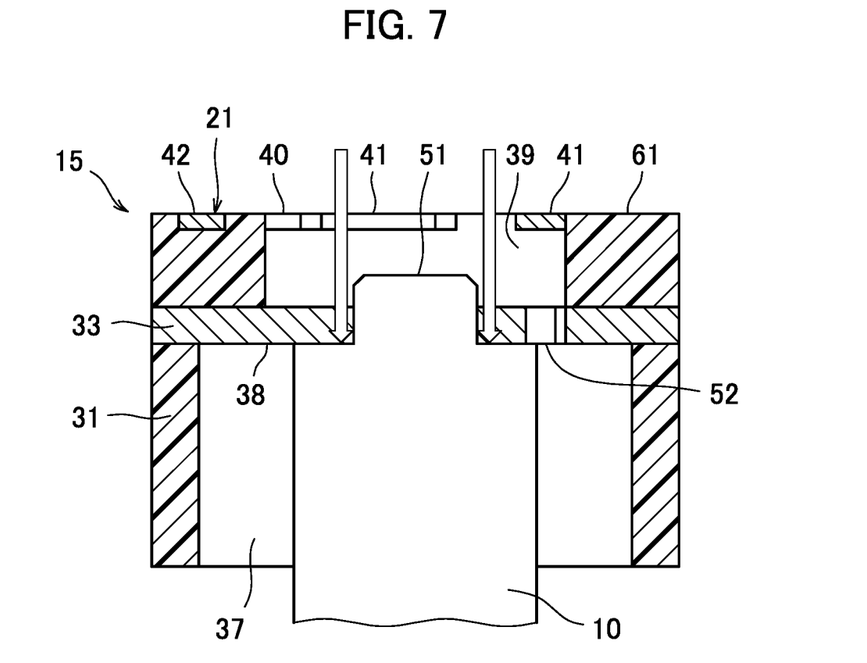
FIG. 7 is an explanatory diagram illustrating a method for fixing the drive gear and the valve shaft.

FIG. 3 is a perspective view of a valve shaft unit 30. FIG. 4 is a diagram illustrating components of the drive gear 15 in the valve shaft unit 30. FIG. 5 is a perspective view of the drive gear 15 in the valve shaft unit 30. FIG. 6 is a perspective view of the drive gear 15 and the valve shaft 10 in the valve shaft unit 30. FIG. 7 is an explanatory diagram illustrating a method for fixing the drive gear 15 and the valve shaft 10. Note that FIG. 7 is a vertical sectional view of a part where the drive gear 15 and he valve shaft 10 are fixed.

As illustrated in FIGS. 3 and 4, the valve shaft unit 30 is configured of the valve shaft 10 and the drive gear 15 made of metal. The drive gear 15 is configured of a gear portion 31 made of a resin, the detection target 21 of the inductive sensor 20, and a lever member 33 (support member) made of metal.

The gear portion 31 is a component with a substantially disk shape formed of a resin, and a gear 35 (for example, a spur gear) is formed over a substantially half (about 180 degrees) of an outer circumferential end thereof. Stopper abutting surfaces 36 that abut the stoppers that are included in the casing 3 and are not illustrated to limit rotation are provided at both ends of the outer circumferential portion in the circumferential direction where the gear 35 is formed. A shaft attachment hole 37 (insertion hole) into which the valve shaft 10 is inserted is included (see FIGS. 2 and 6 to 9) is included at the center of an inner surface 60 of the gear portion 31 (the surface on the side opposite to the surface facing the sensor main body 22; one side surface in the present invention). Note that the shaft attachment hole 37 has a diameter that is slightly larger than the outer diameter of the valve shaft 10. The center portion of the lever member 33 is exposed to the inside of the shaft attachment hole 37 (an exposure portion 38 illustrated in FIGS. 7 and 9).

An outer hole 39 (exposure hole) with a diameter that is smaller than that of the shaft attachment hole 37 is included at the center of the side of the other direction of the gear portion 31 (the surface facing the sensor main body 22). The outer hole 39 and the shaft attachment hole 37 penetrate through the center of the gear portion 31.

The detection target 21 has six radial-direction members 40 having substantially disk shapes of thin plates hollowed out at the centers and extending in the radial direction, three inner circumferential-direction members 41 extending in the circumferential direction and coupling ends of the radial-direction members 40 on the center side, and three outer circumferential-direction members 42 extending in the circumferential direction and coupling ends of the radial-direction members 40 on the outer side. All the radial-direction members 40, the inner circumferential-direction members 41, and the outer circumferential-direction members 42 have widths and thicknesses of about several mm. The radial-direction members 40 are disposed at equal intervals in the circumferential direction, ends thereof on the center side are coupled to one every two inner circumferential-direction members 41, and ends thereof on the outer side are coupled to one every two the outer circumferential-direction members 42 with deviation from the inner circumferential-direction member 41 in the circumferential direction. Note that claw portions for positioning the detection target are included in the inner circumferential-direction members 41 of the detection target 21. The claw portions are provided at circumferential-direction intermediate positions of the outer circumference-side ends of the inner circumferential-direction members 41, have widths and projection lengths of about 1 to 2 mm, and are bent perpendicularly to the inner circumferential-direction members 41.

The detection target 21 is disposed coaxially with the center of the gear portion 31 on the surface of the gear portion 31 on the side of the outer hole 39 (outer side). Also, the surfaces of the inner circumferential-direction members 41 of the detection target 21 on the outer side in the radial direction and the outer edges of the outer hole 39 of the gear portion 31 are located at substantially the same positions in the radial direction.

Grooves 45 that accommodate the outer circumferential-direction members 42 and the radial-direction members 40 are formed in the surface of the gear portion 31 on the outer side.

The lever member 33 is made of metal, has a flat plate shape, and is buried inside the gear portion 31. A circular center hole 50 that is smaller than the outer diameter of the valve shaft 10 opens at the center of the lever member 33. Note that a columnar projecting portion 51 projecting in the axial direction is included at one end of the valve shaft 10, and the projecting portion 51 is inserted into the center hole 50 of the lever member 33. The center hole 50 of the lever member 33 has a diameter that is smaller than that of inner end surfaces of the inner circumferential-direction members 41 of the detection target 21 in the radial direction.

Also, three arc holes 52 extending in arc shapes are open in the periphery of the center hole 50 in the lever member 33. The three arc holes 52 have substantially the same shapes and sizes as those of the inner circumferential-direction members 41 of the detection target 21 and are disposed at substantially the same positions as those of the inner circumferential-direction members 41 in the radial direction and the circumferential direction.

As illustrated in FIG. 5, the gear portion 31, the lever member 33, and the detection target 21 are integrated through insert molding thereby to form the drive gear 15 that is one component. The gear portion 31 is formed of a resin by using the lever member 33 and the detection target 21 made of metal as insert articles. In other words, the lever member 33 and the detection target 21 are combined at the timing when the molding working of the gear portion 31 is completed.

As illustrated in FIG. 6, the valve shaft 10 is fixed to the drive gear 15 including the lever member 33 and the detection target 21 to thereby manufacture the valve shaft unit 30.

Specifically, an end of the valve shaft 10 is inserted into the shaft attachment hole 37 in the gear portion 31 of the drive gear 15, the end of the valve shaft 10 is caused to abut the exposure portion 38 of the lever member 33 exposed from the shaft attachment hole 37, and the projecting portion 51 of the valve shaft 10 is inserted into the center hole 50 of the lever member 33, as illustrated in FIG. 7.

Then, the lever member 33 exposed to the inside of the outer hole 39 is irradiated with laser light from the side of the outer surface 61 (the other side surface in the present invention) of the drive gear 15 to weld the lever member 33 and the valve shaft 10 as illustrated by the arrow in FIG. 7.

Note that the location of welding with the laser light is on the rear side of the abutting surface between the end of the valve shaft 10 and the lever member 33, and the entire circumference of the projecting portion 51 may be welded through the laser welding, or three locations inside the arc holes may be welded.

In this manner, the valve shaft unit 30 that includes the drive gear 15 including the lever member 33 and the detection target 21 and the valve shaft 10 is manufactured.

Figure 8:
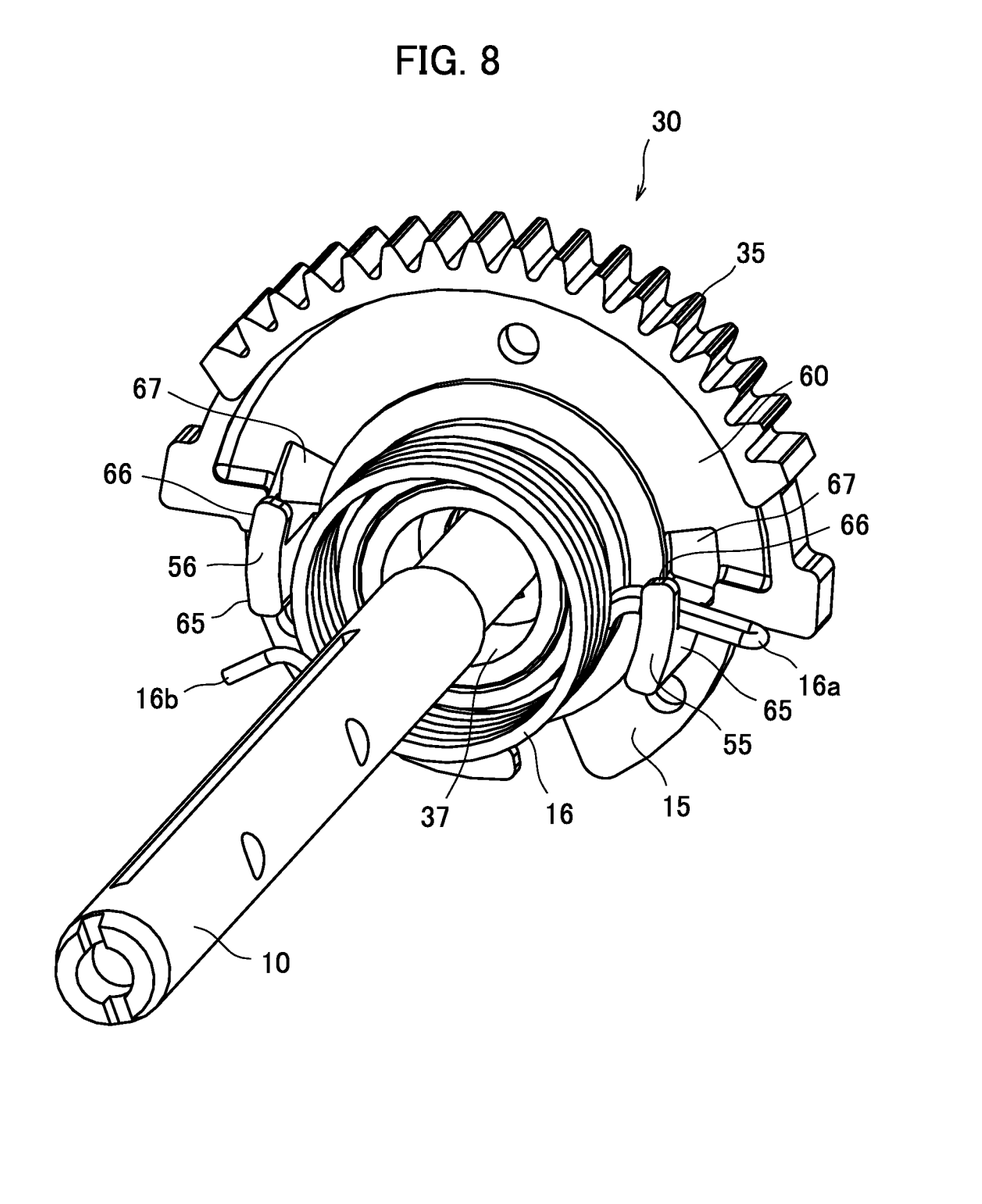
FIG. 8 is a perspective view of the valve shaft unit.
Figure 9:
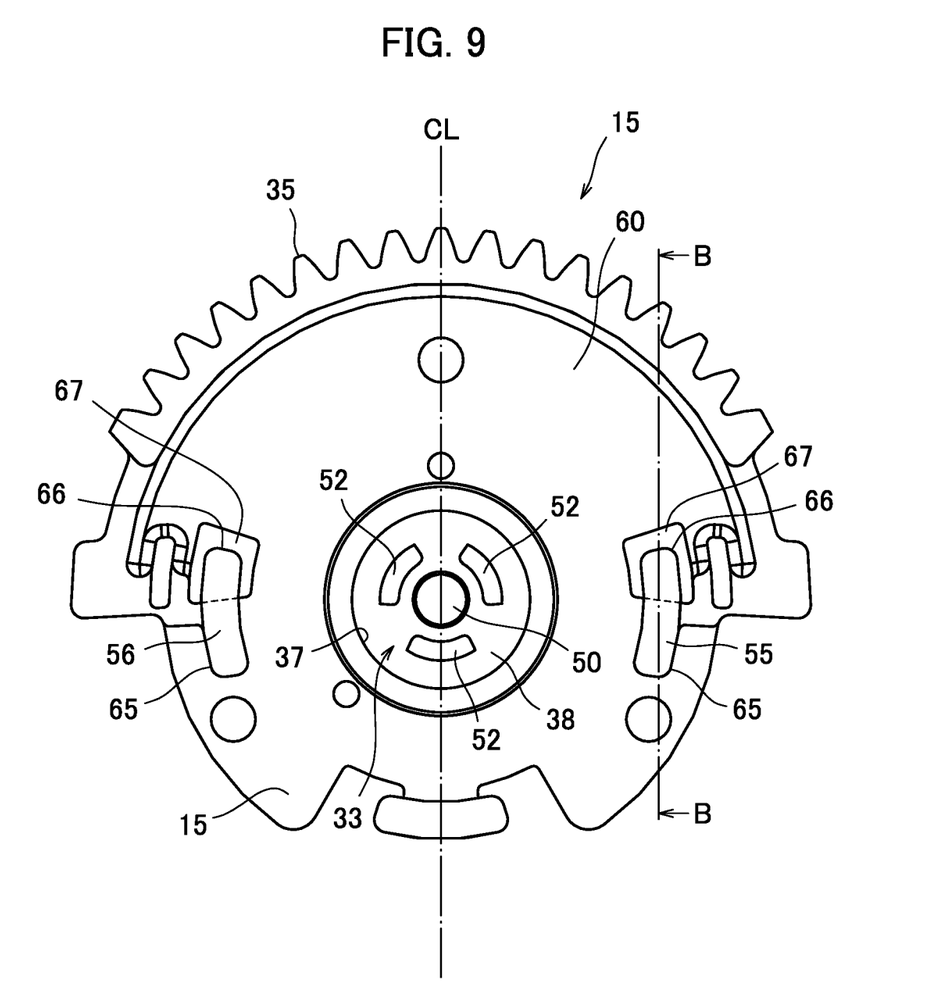
FIG. 9 is a rear view of the drive gear.

FIG. 8 is a perspective view of the valve shaft unit 30. FIG. 8 is a diagram of the valve shaft unit 30 when seen from the side opposite to FIG. 3, that is, from the other end side of the valve shaft 10. FIG. 9 is a rear view of the drive gear 15 and is a view when seen from the side opposite to FIG. 5.

As illustrated in FIG. 8, two locking portions 55 (56) locking the one end 16a of the return spring 16 included at the drive gear 15 are provided on the inner surface 60 of the drive gear 15 (the side surface of the valve shaft 10 on the other end side).

The two locking portions 55 and 56 are located the same positions of the drive gear 15 in the radial direction and are disposed at an interval therebetween in the circumferential direction. Also, the drive gear 15 is formed to be linearly symmetrical with respect to a line CL including the first locking portion 55, the second locking portion 56, and the gear 35 and perpendicularly passing the axial line of the valve shaft 10 as an axis of symmetry.

Note that the return spring 16 in the present embodiment is locked at the first locking portion 55 out of the two locking portions 55 and 56 of the drive gear 15 and biases and rotates the drive gear 15 in the clockwise direction when seen from the other end side of the drive gear 15 on the side opposite to the detection target 21.

Next, the shapes of the locking portions 55 and 56 and the vicinity thereof in the drive gear 15 and a method for manufacturing the drive gear 15 will be described by using FIGS. 5 and 8 to 10.

Figure 10:
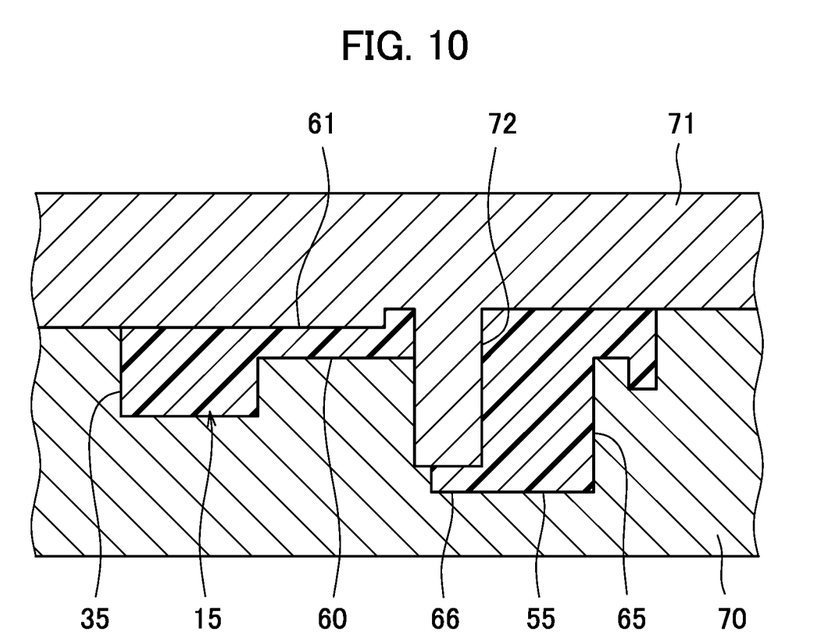
FIG. 10 is a sectional view of the drive gear and a mold die in molding working of the drive gear.

FIG. 10 is a sectional view of the drive gear 15 and mold dies 70 and 71 during molding working of the drive gear 15. FIG. 10 is a sectional view including the drive gear 15 and the mold dies 70 and 71 along the B-B part illustrated in FIG. 9.

The drive gear 15 is configured integrally with the locking portions 55 and 56 supporting one end of the return spring 16 by using a resin or the like.

As illustrated in FIGS. 5 and 8, the locking portions 55 and 56 have hook shapes having extending portions 65 perpendicularly extending from the inner surface 60 (one side surface) of the drive gear 15 on the side of attachment of the return spring 16 to the side of the return spring 16 and distal end portions 66 extending in parallel with the inner surface 60 at an interval of several mm from the distal ends of the extending portions 65.

The drive gear 15 is provided with openings 67 facing the distal end portion 66 to couple the inner surface 60 and the outer surface 61. As illustrated in FIG. 9, the openings 67 are formed to have sizes including the entire distal end portions 66, specifically entire parts projecting from the extending portions 65 in parallel with the inner surface 60 in a plan view of the drive gear 15 (in a view in the direction of the axial line). Note that in the present embodiment, the openings 67 are formed to be slightly larger than the distal end portions 66.

As illustrated in FIG. 10, two mold dies (a first mold die 70 and a second mold die 71) are used when the drive gear 15 is molded through insert molding. A space between the first mold die 70 and the second mold die 71 fitted to each other is filled with a resin to thereby form the drive gear 15.

The first mold die 70 forms the drive gear 15 on the side of the inner surface 60. The second mold die 71 forms the drive gear 15 on the side of the outer surface 61.

The second mold die 71 includes a projecting portion 72 having a rectangular section and projecting toward the first mold die 70. The distal end of the projecting portion 72 further projects to the side of the first mold die 70 as compared with the surface of the first mold die 70 forming the inner surface 60 of the drive gear 15. In this manner, the openings 67 connecting the inner surface 60 to the outer surface 61 are formed.

A space is formed on the distal side in the projecting direction to face the distal end of the projecting portion 72, and the distal end portions 66 are formed by a resin with which the space on the distal side is filled. A space is also formed on one lateral side of the projecting portion 72, the space on the lateral side communicates with the space on the distal side of the projecting portion 72 and another space between the first mold die 70 and the second mold die 71, and the extending portions 65 are formed by a resin with which the space on the one lateral side is filled.

The openings 67 are formed to face the distal end portions 66 of the locking portions 55 and 56 of the drive gear 15 by manufacturing the drive gear 15 by using the second mold die 71 having the projecting portion 72 and the first mold die 70 in this manner.

It is possible to easily remove the drive gear 15 from the first mold die 70 and the second mold die 71 by moving the first mold die 70 and the second mold die 71 in directions in which they are separated from each other in the direction of the axial line of the drive gear 15 after the space between the first mold die 70 and the second mold die 71 is filled with a resin and is then cooled.

On the other hand, in a case where the second mold die 71 does not have the projecting portion 72, that is, in a case where a shape of the drive gear 15 in which the openings 67 are not formed to face the locking portions 55 and 56 is employed, it is difficult to form the hook-shaped locking portions 55 and 56, particularly the distal end portions 66 in the drive gear 15.

If it is attempted to manufacture the drive gear that does not have the openings 67 in this manner, a third mold die filling the space between the distal end portions 66 and the inner surface 60 has to be used in addition to the first mold die 70 and the second mold die 71, and it is necessary to detach the drive gear 15 by moving the third mold die in a direction away from the extending portions 65 after cooling of the resin to avoid the distal end portions 66 and then moving the first mold die 70 and the second mold die 71 in mutually separated directions. Therefore, the number of mold dies increases, and the movement of the mold dies becomes complicated as compared with the present embodiment.

As described above, the drive gear 15 is fixed to the end of the valve shaft 10 to which the valve body 6 is fixed to transmit power from the electric motor 4 in the valve device 1 in the present embodiment.

Also, the valve device 1 includes the return spring 16 that biases and rotates the drive gear 15 in one direction. The return spring 16 has the one end 16a locked at the first locking portion 55 of the drive gear 15 and the other end 16b locked at the casing 3 and defines the valve body in the open state when the electric motor 4 is not operating by biasing and rotating the drive gear 15.

As described above, the locking portions 55 and 56 of the return spring 16 are provided at two locations of the gear portion 31 of the drive gear 15 at an interval in the circumferential direction. Also, the drive gear 15 is formed to be linearly symmetrical with respect to the line CL including the first locking portion 55 and the second locking portion 56 and perpendicularly passing the axial line of the valve shaft 10 as an axis of symmetry.

Therefore, it is possible to lock the counterclockwise return spring 16 as described above at the first locking portion 55 and to lock the clockwise return spring at the second locking portion 56, out of the two locking portions 55 and 56 of the drive gear 15.

In this manner, it is possible to provide the two kinds of valve shaft units (30 or the like), namely the valve shaft unit 30 biasing the valve shaft 10 to the clockwise rotation with the return spring (16 or the like) and the valve shaft unit biasing the valve shaft 10 to the counterclockwise rotation by preparing the two kinds of return springs (16 or he like) with different torsion directions as components in advance and selectively using the return springs (16 or the like) and the locking portions 55 and 56.

Therefore, it is possible to provide two kinds of valve devices, namely the valve device 1 that closes when the electric motor 4 is not operating and the valve device that opens when the electric motor 4 is not operating, and two kinds of valve shaft units used therein while sharing the drive gear 15. It is thus possible to reduce component cost and component management cost.

In the drive gear 15 in the present embodiment, the shaft attachment hole 37 into which the valve shaft 10 is inserted has a circular shape that is larger than the valve shaft 10, and the end of the valve shaft 10 can be inserted into the shaft attachment hole 37 at an arbitrary angle (rotation position) with respect to the drive gear 15. Therefore, it is possible to fix the drive gear 15 at an arbitrary angle through laser welding with respect to the attachment angle of the valve body 6 with respect to the valve shaft 10. In this manner, it is possible to provide valve shaft units and valve devices with different attachment angles of the drive gear 15 while sharing the drive gear 15 and the valve shaft 10.

Although the locking portions 55 and 56 provided at the drive gear 15 have hook shapes, the openings 67 are provided at the positions of the drive gear 15 at which the openings 67 overlap the distal end portions 66 of the locking portions 55 and 56 in a view in the direction of the axial line, and it is thus possible to mold the drive gear 15 including the locking portions 55 and 56 with the pair of mold dies 70 and 71 and to easily release the mold dies 70 and 71 after the molding. In this manner, it is possible to reduce the number of mold dies used for the molding working and to facilitate the movement of the mold dies 70 and 71.

Furthermore, it is possible to include a plurality of spaces to be filled with a resin in an aligned manner in the first mold die 70 and the second mold die 71 and to manufacture a plurality of drive gears 15 with the pair of mold dies 70 and 71. In this manner, it is possible to significantly improve productivity of the drive gears 15.

Although the description of the embodiment has been provided hitherto, aspects of the present invention are not limited to the above embodiment. For example, detailed shapes of various components, such as the shape of the gear portion 31 of the drive gear 15, may be appropriately changed.

Also, although the present invention has been applied to a throttle valve in the above embodiment, it is possible to apply the present invention to various valve devices other than the throttle valve.

REFERENCE SIGNS LIST

1 Valve device
6 Valve body
10 Valve shaft (shaft)
15 Drive gear (gear)
4 Electric motor (actuator)
16 Return spring (torsion coil spring)
20 Inductive sensor (non-contact sensor)
21 Detection target
30 Valve shaft unit
33 Lever member (support member)
37 Shaft attachment hole (insertion hole)
38 Exposure portion
39 Outer hole (exposure hole)
55 First locking portion (locking portion)
56 Second locking portion (locking portion)
60 Inner surface (one side surface)
65 Extending portion
66 Distal end portion
67 Opening

What is claimed is:

1. A valve device including a gear at a shaft driving a valve body, driving and rotating the shaft via the gear by an actuator, and driving the valve body, the valve device comprising:
    a torsion coil spring biasing and rotating the gear in one direction and defining a rotation position of the valve body when the actuator is not operating,
    wherein one end of the torsion coil spring is locked at locking portions provided at the gear, and another end is locked at a casing rotatably supporting the shaft,
    the locking portions are provided at two locations of the gear at an interval in a circumferential direction,
    the gear is a plate-shaped member formed to be linearly symmetrical with respect to a line including the two locking portions and vertically passing through an axial line of the shaft as an axis of symmetry,
    the locking portions are formed into hook shapes including extending portions extending in a direction away from one side surface of the gear and distal end portions projecting along the one side surface from distal ends of the extending portions, and
    the gear includes openings at positions at which the openings overlap the distal end portions in a view in a direction of the axial line.

2. The valve device according to claim 1,
    wherein the gear includes a support member made of metal and integrated through insert molding in a state where at least a part of the support member is exposed in one side surface, and
    an exposure portion of the support member of the gear and an end of the shaft are welded to configure a shaft unit.

3. The valve device according to claim 2,
    wherein the gear has an exposure hole exposing the other side surface side of the support member on a rear side of the exposure portion, and
    a rear side of an abutting surface where the support member abuts the shaft is irradiated with laser light through the exposure hole from the other side surface side of the gear with the exposure portion of the support member and the end of the shaft caused to abut each other, to weld the support member and the shaft.

4. The valve device according to claim 1, wherein the gear includes an insertion hole into which an end of the shaft is insertable at an arbitrary relative rotation position around the axial line.

5. The valve device according to claim 1, wherein the valve device is a throttle valve controlling an amount of air intake of an internal combustion engine.

6. The valve device according to claim 4, wherein the valve device is a throttle valve controlling an amount of air intake of an internal combustion engine.

* * * * *